Oct. 2, 1956 G. J. HEIMBIGNER 2,764,926
GRASS-AND SOD-TRIMMING DEVICE
Filed June 1, 1954
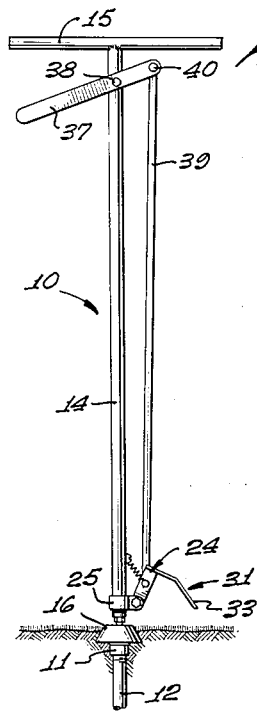
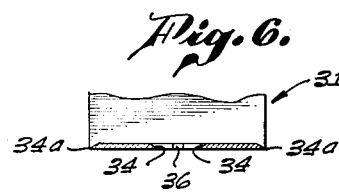
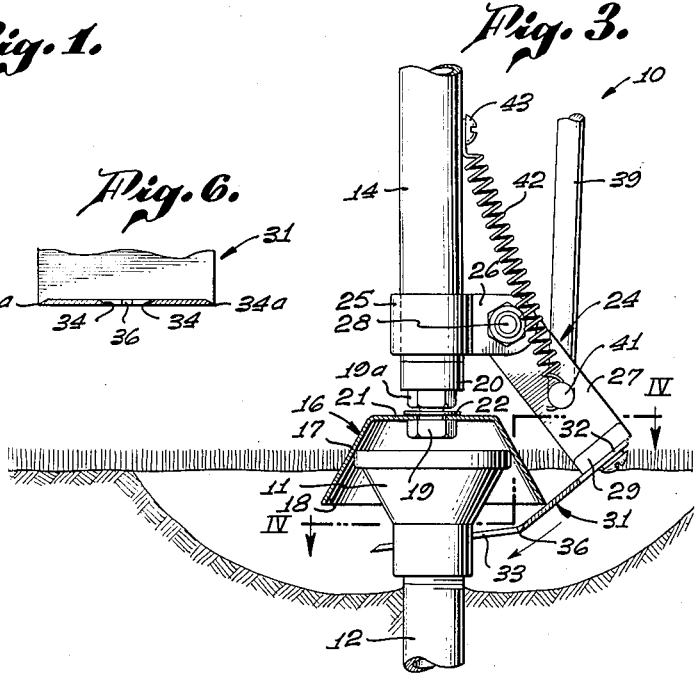
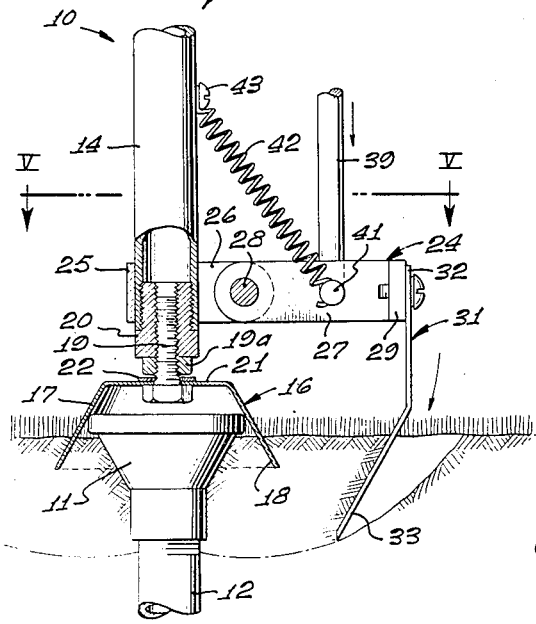
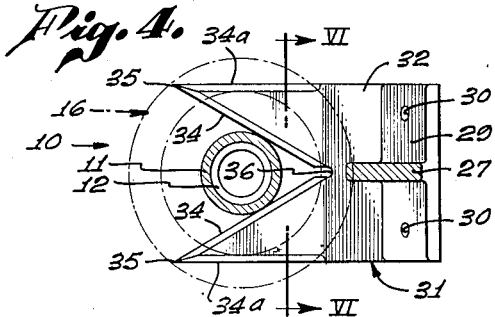
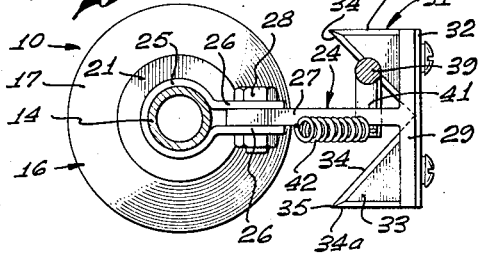
INVENTOR.
GILBERT J. HEIMBIGNER,
BY
ATTORNEY.

United States Patent Office 2,764,926
Patented Oct. 2, 1956

2,764,926
GRASS- AND SOD-TRIMMING DEVICE
Gilbert J. Heimbigner, Los Angeles, Calif.
Application June 1, 1954, Serial No. 433,393
6 Claims. (Cl. 97—227)

This invention relates to a grass- and sod-trimming device and particularly to a device for trimming grass around a sprinkler head in a sprinkler system.

Sprinkler systems for lawns include an arrangement of underground sprinkler conduit provided with upstanding risers at spaced intervals. To each riser is attached a sprinkler head so that the sprinkler head is positioned at approximately ground level or slightly therebelow. Usually a recess is provided in the ground at each sprinkler head and riser to permit unobstructed operation of the sprinkler head. After initial installation, the recess provided around each sprinkler head tends to partially fill with dirt and grass tends to grow closely around each sprinkler head. If this grass is permitted to extend over the sprinkler head, the flow of water therefrom will be obstructed and the area irrigated by the sprinkler head will be restricted. Heretofore each sprinkler has been cleared of grass and dirt by hand and utilizing hand-operated grass shears. In order to clear the grass and sod away from each sprinkler head it was necessary to bend over or kneel adjacent thereto. Such a method for trimming grass from each sprinkler head was extremely tedious, awkward and time consuming.

This invention contemplates a grass- and sod-trimming device wherein grass which has grown into the recess adjacent each sprinkler head may be readily cut and removed therefrom and wherein a neat circular recess cleared of grass or sod is provided. The invention contemplates a trimming device which may be effectively operated while in standing position and which provides leverage facilitating the cutting of grass and sod.

The primary object of this invention is to disclose and provide a grass- and sod-trimming device which is easily operable and which is capable of effectively cutting and removing grass and sod from around a sprinkler head.

An object of this invention is to disclose and provide a grass-trimming device which may be centered and supported on a sprinkler head during a grass-cutting operation.

Another object of this invention is to disclose and provide a trimming device wherein knife means are provided which are movable into a lowered position which extends below the centering means of the device and beneath a sprinkler head.

A further object of this invention is to disclose and provide a trimming device wherein knife means are adapted to be moved about a horizontal axis for swinging downwardly from a position above a sprinkler head to a position below and slightly beyond the riser carrying a sprinkler head.

Generally speaking this invention contemplates a grass- and sod-trimming device which is capable of cutting a circular recess centered upon and around a sprinkler head. The trimming device comprises a vertical body element provided with a handle and a centering means carried at the bottom of the element for engagement with a sprinkler head. A cutter carriage is pivotally mounted on one side of the body element above the centering means for swinging movement about a horizontal axis. The cutter carriage carries a knife means which are adapted to be urged downwardly and toward a riser by actuating means carried by the body element adjacent to the handle thereof. The actuating means includes a lever system whereby the knife means readily cuts any grass or sod in its swinging movement downwardly to a position beneath the sprinkler head. Spring means may be provided for normally biasing the cutter carriage into retracted position.

Other objects and advantages of this invention will be readily apparent from the following description of the drawings in which an exemplary embodiment of this invention is shown:

In the drawings:

Fig. 1 is a side view of a sod-trimming device embodying this invention positioned on a sprinkler head and with the knife means in retracted position.

Fig. 2 is an enlarged fragmentary side view partially in section showing the trimming device with the knife means thereof in sod cutting position, the section being taken in a vertical plane passing through the axis of the vertical body element.

Fig. 3 is a fragmentary side view partially in section showing the knife means in lowermost position.

Fig. 4 is a transverse sectional view taken in the planes indicated by line IV—IV of Fig. 3.

Fig. 5 is a transverse sectional view taken in the plane indicated by line V—V of Fig. 2.

Fig. 6 is a partial section view taken in the plane indicated by line VI—VI of Fig. 4.

In Fig. 1 is illustrated a trimming device generally indicated at 10 which embodies this invention, said trimming device being positioned over and seated upon a sprinkler head 11 of a sprinkler system. The sprinkler head 11 is carried by an upstanding riser 12 which is connected at its bottom to a buried water supply conduit or pipe not shown. It will be noted that the top of the sprinkler head 11 may lie approximately at the level of the ground surface. In some instances the sprinkler head 11 may be located below the level of the ground surface as when pop-up type of sprinkler heads are employed, such sprinkler heads being displaced vertically upwardly by fluid pressure during sprinkling.

The trimming device 10 includes a vertical body element 14 which may comprise a lightweight hollow metal rod or pipe. At its top the body element 14 may be provided with a transversely extending handle 15 connected thereto in any suitable manner.

At the bottom of the body element 14 may be provided a centering means 16 for cooperable engagement with the sprinkler head 11. The centering means 16 in this example comprises a downwardly directed, inverted frusto-conical cup-shaped element 17 having its large open end 18 adapted to receive therewithin the sprinkler head 11 so that the head may contact the inner surface of the cup-shaped element 17 along a circular line spaced inwardly from the open end. The cup-shaped element 17 may be pivotally mounted on the end of body element 14 by means of an upwardly extending bolt 19 threaded into a bushing 20 threaded into the lower end of the body element 14. The bolt 19 may be locked in the bushing 20 by any suitable locking means such as a lock nut 19a. Between lock nut 19a and the bottom wall 21 of the cup-shaped element 17 may be provided a bearing washer 22 to permit relative rotation of the cup-shaped element 17 with respect to the body element 14.

It is understood that while a cup-shaped rotatable centering means is provided in this example, other means for centering the device on a sprinkler head may be employed, as for example the body element may be provided with a point centering device fixed thereto and which may be inserted into the nozzle opening of the sprinkler head.

A cutter carriage 24 is pivotally carried by the lower end portion of the body element 14 by means of a suitable collar 25 which encircles the body element 14 and which may be provided with a pair of parallel spaced sidewardly extending ears 26. The ears 26 may receive therebetween one end of a carriage arm 27, said arm being pivotally connected to the ears 26 as by a pivot bolt and nut assembly 28. The ears 26 extend sidewardly from the body element 14 to provide a horizontal pivotal axis positioned approximately above the circumference of a sprinkler head 11. The carriage arm 27 is connected to a knife support member 29 arranged transversely with respect thereto, said knife support member being provided with spaced ports 30 through which bolt and nut assemblies may extend for securing a knife means 31 to the cutter carriage.

The knife means 31 may include a securing portion 32 of approximately the same length as the support member 29 and adapted to be fastened thereto as above mentioned. Angularly disposed with respect to the support portion 32 may be a cutting portion 33 of bifurcated configuration. The bifurcated cutting portion 33 includes converging cutting edges 34 which extend from spaced points 35 to a central point 36. The cutting portion 33 also includes parallel outer cutting edges 34a which extend from points 35 for the length of the angularly disposed cutting portion. It should be noted that the cutting edges 34 are of sufficient length so that when the cutter carriage is in lowermost position the points 35 extend to the other side of the riser 12 below the sprinkler head 11.

Means for actuating the cutter carriage 24 may comprise a lever arm 37 pivotally connected intermediate its ends as at 38 to the body element 14 below the handle 15. The lever arm 37 is positioned so as to be readily grasped by the fingers of a hand which is resting upon the handle 15. At one end of the lever arm 37 a depending actuating rod 39 may be pivotally connected as at 40, the lower end of rod 39 being bent inwardly for pivotal connection at 41 to the cutter arm 27 intermediate its ends. Spring means 42 for biasing the cutter carriage into retracted upper position may be connected at one end to the bent end portion of rod 39 providing the pivotal connection at 41 and at its other end to a pin 43 secured to the body element 14 above the collar 25.

In operation the trimming device may be positioned and centered on a sprinkler head 11 by placing the cup-shaped centering member 17 thereover. Grasping of the end of the lever arm 37 opposite to the pivotal connection 40 and lifting said end towards the handle 15 will cause the cutter carriage to swing downwardly about the horizontal pivotal axis provided at 28. As the cutter carriage swings downwardly the points 35 of the knife means enter the sod and grass surrounding the sprinkler head 11, and as the cutting edges 34 are advanced toward the riser such sod or grass will be cut thereby. It will be apparent that if the grass is tough, the converging knife edges 34 will facilitate the cutting thereof, and the embracing of the riser 12 by said converging knife edges will further facilitate cutting of said grass or sod. After the knife means has been moved to its lowermost position below the centering means and the sprinkler head, release of the actuating lever 37 will result in the cutter carriage and knife means being withdrawn from its lowermost position until the cutter carriage reaches an uppermost position where the knife means is clear of the grass. The trimming device may then be rotated through several degrees so that upon grasping and raising of the lever arm 37 a second segment of grass encircling the sprinkler head will be cut. This operation is repeated entirely around the sprinkler head. As a result, the grass and sod surrounding the sprinkler head will be conveniently and readily cut for easy removal thereof. After the grass and sod has been substantially removed, the trimming device may be readily rotated about the centering means so that the outer cutting edges 34a will further trim any irregularities. A neat concentric circular recess will be provided about a sprinkler head.

In some instances a sprinkler head is positioned immediately adjacent a right-angle corner of a walk, the sprinkler head being designed for ejecting water through only an arc of 90°. The trimming of grass and sod around such part-circle sprinkler heads may be readily accomplished by this trimming device by first cutting segments of the grass and sod within the 90° arc as previously described. The outer cutting edges 34a on the cutting portion of the knife means will permit cutting of grass up to the edges of the adjacent walk. It will thus be readily apparent that the trimming device of this invention is not only effectively operable upon full-circle sprinkler heads but also upon part-circle sprinkler heads.

It will be readily understood by those skilled in the art that other knife means may be used. For example, a knife blade embodying only one half of the bifurcated knife means illustrated may be used in place of the bifurcated knife means shown. In each instance, however, it is important to note that the cutting portion of the knife means is swung downwardly toward the riser from an upward position until it reaches a lowermost position wherein portions of the cutting edge extend to and slightly beyond the far side of the riser. The cutting of grass and sod completely around the riser is thereby assured.

It will be readily understood by those skilled in the art that various modifications and changes may be made that come within the spirit of this invention, and all such changes and modifications coming within the scope of the appended claims are embraced thereby.

I claim:

1. In a grass- and sod-trimming device, the combination of: a vertical body element provided with a handle at the top and a downwardly directed centering means at the bottom; a cutter carriage pivotally mounted on one side of the body element above the centering means; knife means carried by the carriage; actuating means including a lever pivotally carried by the body element adjacent the handle for pivoting the cutter carriage and forcing the knife means carried thereby from a position above the level of the centering means and away from the body element into a lowered position below the centering means and body element; said knife means in said lowered position extending to the side and beyond the axis of the body element.

2. A trimming device as stated in claim 1 wherein the centering means includes a downwardly directed and outwardly flared cup-shaped element mounted for relative rotatable movement with respect to the body element.

3. A trimming device as defined in claim 1 wherein the knife means includes a bifurcated cutting portion provided with converging cutting edges to extend on opposite sides of the axis of the body element in lowered position.

4. A trimming device as stated in claim 3 wherein the cutting portion includes outer cutting edges.

5. A grass- and sod-trimming device for trimming grass and sod around a fixed sprinkler head comprising: a vertical body element provided with a transverse handle at the top and a downwardly directed centering means at the bottom adapted to rest upon said sprinkler head; a cutter carriage mounted for pivotal movement about a horizontal axis at one side of the body element above the centering means; knife means carried by the carriage in spaced relation to the centering means and positioned above said centering means in retracted position; actuating means including a lever pivotally mounted on the body element adjacent the handle and a rod pivotally connected to one end of the lever and to the cutter carriage for swinging the cutter carriage about said axis, said actuating means being adapted to force the knife means downwardly and to a lowermost position below the centering means, said knife means in lowered position having cutting edges extending to the other side and beyond the axis of the body element.

6. In a sod-trimming device, the combination of: an elongated body element provided with a handle at one end and an axially disposed centering means at the other end; means including a cutter carriage pivotally carried on the body element in spaced relation to the centering means; knife means carried by the carriage; and actuating means including a lever pivotally connected with the body element and with the carriage for forcing the knife means from a retracted position spaced outwardly from the centering means into a lowered position spaced from the centering means and the body element in an axial direction, said knife means including a knife edge askew to the axis of the body element and in lowered position extending beyond the axis of the body element.

References Cited in the file of this patent

UNITED STATES PATENTS

| | | |
|---|---|---|
| 1,480,151 | Cosman | Jan. 8, 1924 |
| 1,537,537 | Liebscher | May 12, 1925 |
| 1,543,996 | Franks | June 30, 1925 |
| 1,765,288 | Schmidt | June 17, 1930 |
| 1,791,957 | Cummings | Feb. 10, 1931 |
| 1,800,905 | Rieff | Apr. 14, 1931 |
| 2,015,109 | Hays | Sept. 24, 1935 |
| 2,564,148 | Broderick | Aug. 14, 1951 |